US006964458B2

(12) United States Patent  
Marchesini (10) Patent No.: US 6,964,458 B2  
(45) Date of Patent: Nov. 15, 2005

(54) DEVICE FOR AUTOMATICALLY RESETTING THE EMERGENCY BRAKE ON TRAINS

(76) Inventor: Luigi Marchesini, Via Ruffilli, 1, 1-46047 Porto Mantovano (IT)

( * ) Notice: Subject to any disclaimer, the term of this patent is extended or adjusted under 35 U.S.C. 154(b) by 0 days.

(21) Appl. No.: 10/649,360

(22) Filed: Aug. 27, 2003

(65) Prior Publication Data

US 2004/0134719 A1 Jul. 15, 2004

Related U.S. Application Data

(63) Continuation of application No. PCT/IT02/00113, filed on Feb. 26, 2002.

(30) Foreign Application Priority Data

Feb. 27, 2001 (IT) .......................... MN2001A0009

(51) Int. Cl.[7] ............................................. B60T 15/36

(52) U.S. Cl. ................................ 303/18; 303/3; 303/9

(58) Field of Search .............................. 303/1.3, 15, 9, 303/18, 7; 188/112 R, 112 A (56) References Cited

U.S. PATENT DOCUMENTS

| 4,368,927 A | * | 1/1983 | Billingsley et al. ........... 303/18 |
| 4,795,002 A | * | 1/1989 | Burgei et al. ............... 188/2 D |
| 6,237,722 B1 | * | 5/2001 | Hammond et al. ..... 188/1.11 R |

FOREIGN PATENT DOCUMENTS

| DE | 3408013 | 9/1985 |
| GB | 1 527 815 | 10/1978 |

* cited by examiner

Primary Examiner—Matthew C. Graham  
(74) Attorney, Agent, or Firm—Thomas R. Vigil; Welsh & Katz, Ltd.

(57) ABSTRACT

The device for automatically resetting the emergency brake on trains, allows the railway staff to maintain control over the train, above all in critical situations, so that the said train can be moved far enough to bring it out of a tunnel or a dangerous situation. The device essentially comprises a handle designed to control the brake, a rotary plate, designed to rotate under the control of the handle and a couple of levers, a main piston which slides inside a couple of chambers designed to realize the automatic resetting of the brake, a tank for storing the air to be used for resetting the device after its activation connected to the main conduit which is used to stop the train, and resetting and monitoring means.

36 Claims, 3 Drawing Sheets

DEVICE FOR AUTOMATICALLY RESETTING THE EMERGENCY BRAKE ON TRAINS

FIELD OF THE INVENTION

The invention relates to a device for automatically resetting the emergency brake on trains.

BACKGROUND ART

As it is known, railway accidents occur more frequently nowadays, and some of these have minor consequences, but others have catastrophic consequences.

The current conditions which contribute to the increase in accidents are multiple. It has been found that there is a greater number of people travelling and therefore a greater number of trains moving. The means of transport are becoming increasingly sophisticated but are more prone to problems, and in fact, there is an increasing amount of electrical equipment present (air conditioning, automatic door opening and closing, static converters, electrical conductors for heating systems, etc.) which make the train more comfortable, faster and more modern but also more delicate and liable to problems such as come short circuits or overheating in certain parts which could facilitate the starting of fires.

The higher travelling speeds of the trains also facilitates the overheating of metal parts which could start or facilitate the spread of a fire.

In addition to the aforesaid points, for example, inside the carriages there are fabrics which, although they are fireproof, in the event of a fire, release toxic fumes that are highly dangerous for the passengers.

At the moment, for the very reason of the high potential for problems, there is a particular need to increase the safety levels in the trains both to protect the passengers and the railway staff and also the trains and the environment.

Particular studies performed to bring about higher safety standards have considered a situation in which the danger is great and, in particular conditions, the consequences would be extremely serious.

The aforesaid situation refers to a fire, even a relatively small fire, on a train travelling through a tunnel.

The situation analysed was that of a train with twelve to sixteen carriages, therefore potentially capable of transporting from seven hundred to nine hundred people, on which a fire starts at a certain point of the route. The panic and chaos it would cause are unimaginable and the obvious reaction of many people would be to stop the train by pulling the emergency brake in order to be able to get off and reach safety. If the emergency brake were pulled, for example, at the entrance to a tunnel three or four kilometres long or longer—and there are many of these tunnels—depending on the speed, the train would stop at least a kilometre into the tunnel. If the emergency brake used were that of the carriage in which the fire had broken out, no-one would be able to reach that point to reset the brake and there would be absolutely no possibility of the train moving with the further consequence that the panic and the chaos would become uncontrollable and there would be practically no possibility of reaching safety for nearly the totality of the persons because of the fire, the combustion fumes, the confined space within the tunnel and the impossibility of rescue workers intervening.

In clarification of the points made so far, a general explanation should be given of how the brakes on trains work. A main conduit starts at the locomotive of the train and is present in each carriage. When a train is composed, the different portions of the main conduit are connected together to make a single conduit through which air passes at a pre-set pressure which is used to keep the brakes in a non-operative condition. When the driver wishes to stop the train, he must simply decrease the air pressure in the main conduit and this decrease in pressure will activate a braking device which controls and activates a pneumatic system which engages the blocks or the disks on the wheels and stops the train. To deactivate the brakes, he must simply increase the pressure in the main conduit again. The emergency brake also works in a similar way and, in fact, the pulling of a handle located in each carriage causes air to be released from the main conduit and makes the braking device described earlier intervene, leading to the train braking and consequently stopping.

In more detail, nowadays, when the emergency brake handle is pulled downwards, a clamping element is released which, driven by a spring, pushes a piston upwards, the said movement opening a passageway for the air to flow through from the main conduit towards the external atmosphere. In this way, by lowering the pressure in the main conduit, one activates the train's brakes. To reset the brake, the intervention of the railway staff is indispensable, who must, in fact, reposition the handle that has been pulled, and in doing so, the clamping element is hooked up and the piston to close the passageway for the air is pulled down.

Clearly, it is only possible to work on the handle concerned and there is at least one in each carriage so if a fire broke out in the carriage where the handle has been pulled it is impossible for the brake to be reset and the train can no longer move. If the situation described occurred in a in tunnel, it would be even more difficult to intervene with all the consequences of the case.

BRIEF SUMMARY OF THE INVENTION

The aim of the present invention is substantially to resolve the problems of the commonly known technique overcoming the drawbacks described by means of a device for automatically resetting the emergency brake on a train once the train has stopped or is on the point of stopping in order to be able to move the said train just enough to allow it to leave the tunnel or the dangerous situation.

A second aim of this invention is to make available a device for automatically resetting the emergency brake on trains which is capable of permitting the railway staff to maintain control of the train, above all in critical and dangerous situations.

A further aim of the present invention is to manufacture a device which can be installed not only in new trains but also in existing trains.

A still further aim of the present invention is to manufacture a device which allows the train to move just enough to be able to allow the outflow of the people into an area which is not dangerous.

A still further aim of this invention is to make available a device capable of obtaining a greater flexibility of use and therefore a notable safety level for the passengers, the railway staff and the train.

A still further aim of this invention is to make available a device which is easy to manufacture, works well and is structurally simple.

These aims and others, which will emerge more clearly over the course of the present description, are substantially achieved by a device for automatically resetting the emergency brake on trains, as laid forth in the claims that follow.

BRIEF DESCRIPTION OF THE SEVERAL VIEWS OF THE DRAWINGS

Further characteristics and advantages will emerge more clearly from the detailed description of a device for automatically resetting the emergency brake on trains, according to this invention, laid out hereafter with reference to the drawings enclosed, which are provided for the sake of a example and are therefore not limiting, in which.

DETAILED DESCRIPTION OF THE INVENTION

With reference to the aforesaid figures, 1 denotes the whole device for automatically resetting the emergency brake on trains, according to the present invention.

Figure 1:
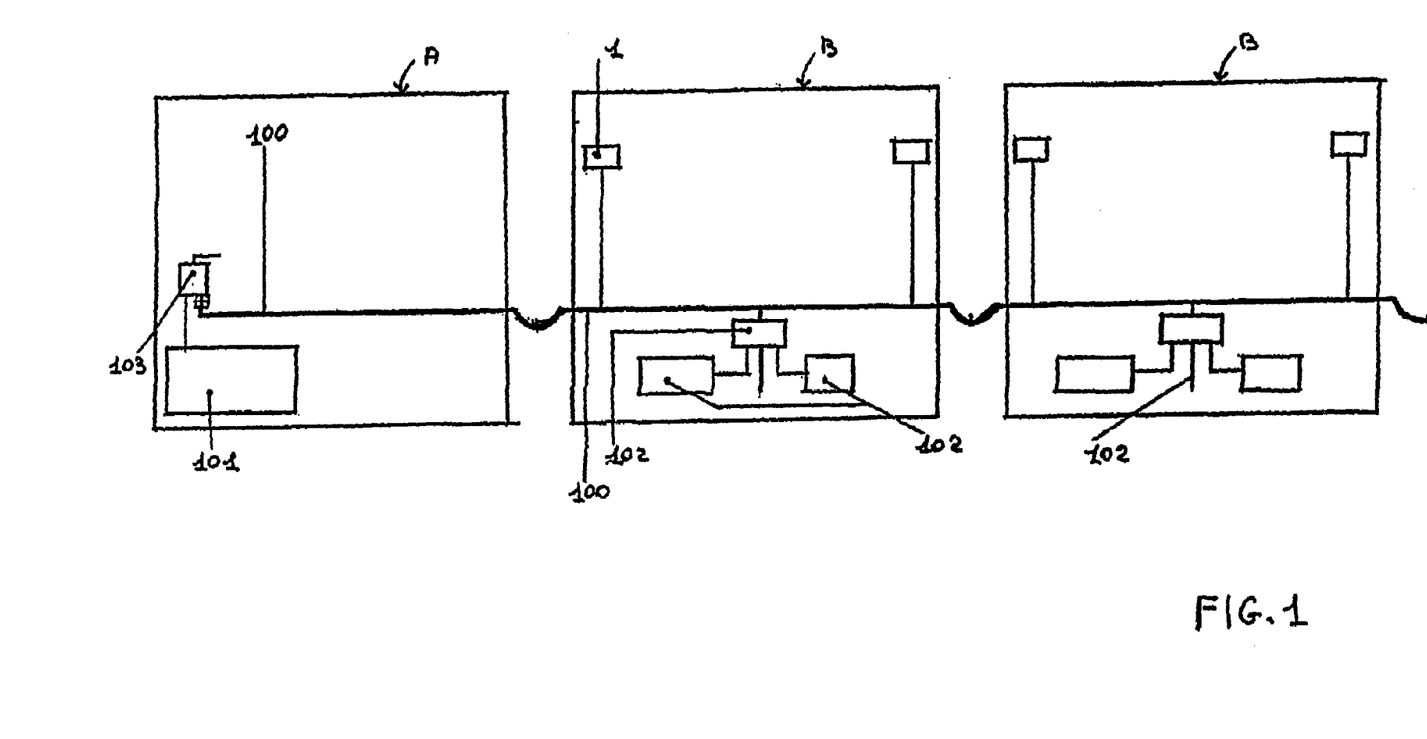
FIG. 1 shows (schematically) the braking system in a train.

As mentioned earlier and as shown in FIG. 1, a train is generally composed of a locomotive A and a plurality of carriages B. A main conduit 100 starts at the locomotive A of the train, the said main conduit also being present in each carriage, and when a train is composed, the diverse portions of the main conduit are connected together to create a single conduit through which the air passes, the said air being supplied by a feeder tank 101 at a pre-set pressure of 5 bar and used to keep the brakes in a non-operative condition.

Figure 2:
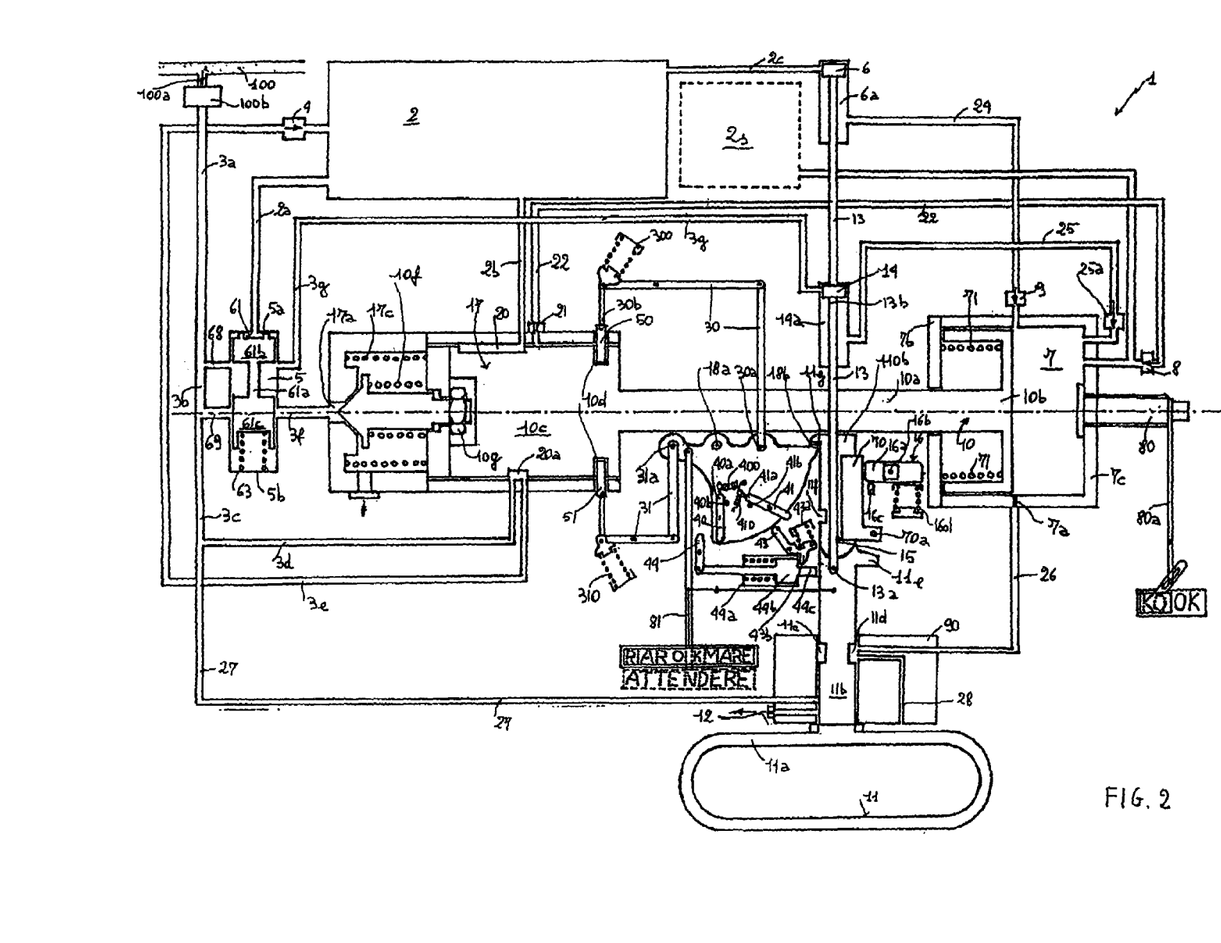
FIG. 2 shows (schematically) a device for automatically resetting the emergency brake on trains in the resting condition.

As shown in FIG. 2, in each carriage, a conduit 100a branches off from the main conduit 100, the said conduit 100a being connected to the device for automatically resetting the brake 1. The device 1 comprises a first tank 2 provided for the accumulation of air to be used for resetting the device, after its activation, and connected to the main conduit 100 by means of the conduit 100a equipped with an air filter 100b and a plurality of channels 3a, 3b, 3c, 3d and 3e and a check valve 4 located in the channel 3e and almost at the entrance to the said tank. The tank has the same pressure level as the main conduit.

Figure 3:
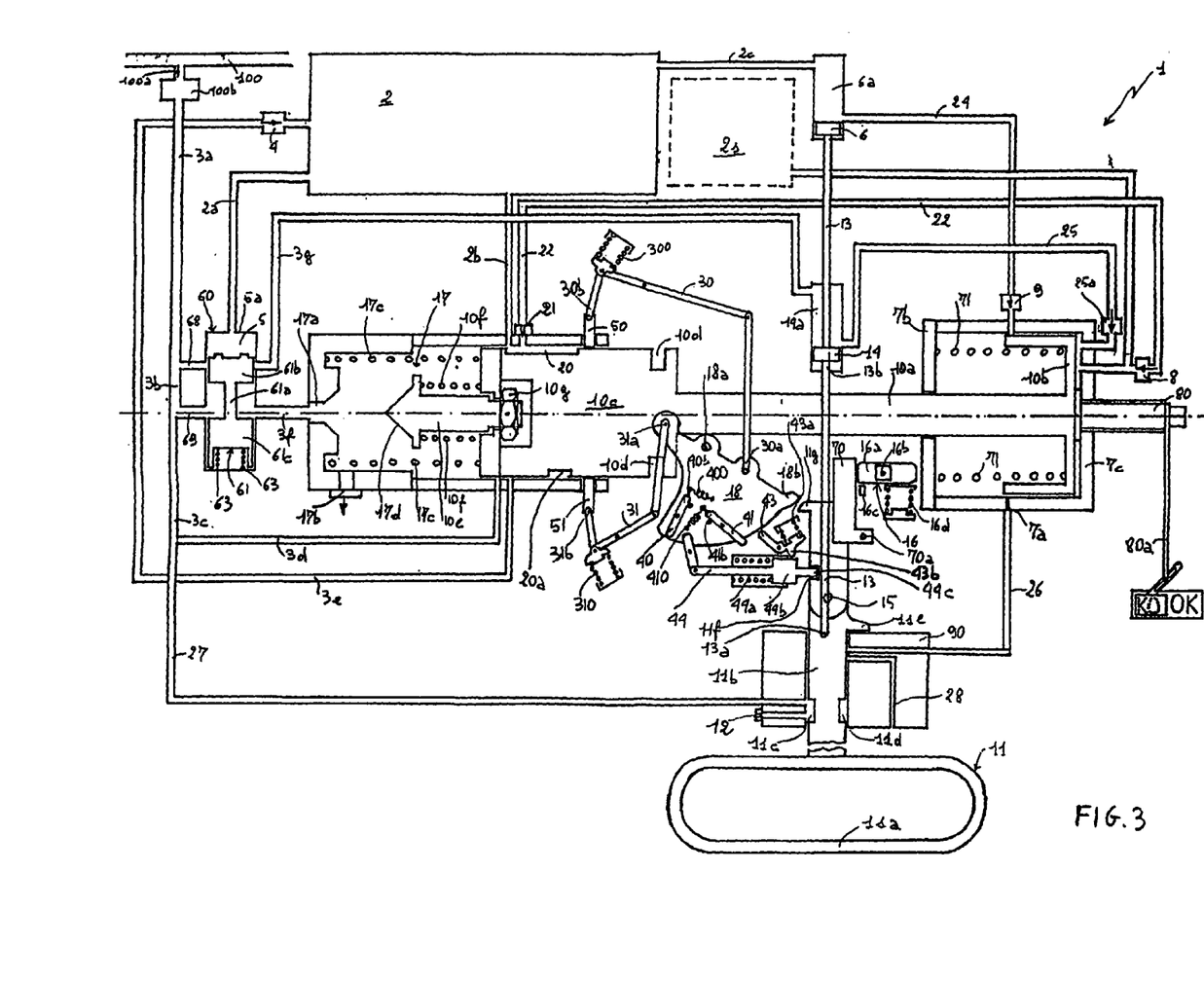
FIG. 3 shows (also schematically) the device in FIG. 2 in the operative condition.

A first channel 2a starts from the tank 2 and ends in a chamber 5, as shown in FIG. 3, a second channel 2b, which reaches a main piston 10 (which will be described later) and a third channel 2c, ends in a small chamber 6a in which there is a small piston 6.

The device 1 comprises a chamber 7 used for resetting the device, after the emergency brake has been activated. The air coming from the tank 2 expands within the chamber 7 and causes the movement of the main piston 10 contained within it, bringing it back into the non-operative condition shown in FIG. 2.

The air in question flows from the tank 2 along the second channel 2b, passes through a groove 20 fitted with a calibrated hole 21 and continues along a channel 22 which joins the chamber 7, passing through a check valve 8.

The air, making its way along the route just described from the tank 2 to the chamber 7, as gradually flows into the chamber 7, moves the main piston 10 from the operative condition shown in FIG. 3 to the non-operative condition.

The movement of the piston 10 will make the position of the groove 20 move so that it is no longer in contact with the calibrated hole 21 through which the air can no longer pass on its way towards the channel 22 leading to the chamber 7.

The movement of the piston 10 causes, in addition to the closure of the calibrated hole 21, the passage of the air, through the third channel 2c and the small chamber 6a, into a channel 24 until the said air reaches the chamber 7 through a check valve 9. The passage of the air, as just described, occurs because the emergency brake has been activated (FIG. 3).

The flow of air into the chamber 7 continues until the piston 10 reaches the stroke limit, i.e. it is in the non-operative condition. In particular, the check valve 4 mentioned earlier is envisaged to keep the pressure in the tank 2 constant while the valves 8 and 9 are arranged to enable a more rational use of the air used to reset the brake automatically and to prevent any untimely backflow of air.

The device 1 has a channel 25 which connects together a small chamber 14a and the chamber 7 for the flow of air to the said chamber and a channel 26 which starts from the chamber 7 is provided to release air from the said chamber, once the device has been reset, after the emergency brake has been activated.

The device 1 also comprises a handle 11 composed of a handgrip 11a and a shank 11b. In particular, the handgrip 11a, which is a commonly known type of handgrip, is designed to activate the emergency brake and is arranged to be able to take two positions: the resting condition when it is not in use and the emergency brake is not active and the operative condition when it has been pulled and the brake is functioning. Moreover, the shank 11b has a cylindrical configuration which has a couple of gaps 11c and 11d which are symmetrical in relation to the axis created by the said shank, a first overhang 11e coming from the gap 11d, a groove 11f and a second overhang 11g positioned in sequence from the gap 11c.

In more detail, in the non-operative condition the gap 11c does not have any function, while in the device's operative condition, i.e. when the handle has been pulled, it connects the main conduit 100 via the channels 3a, 3b and 3c and a channel 27 which is connected to the channel 3c and ends in position with the gap 11c making a part of the air present in the main conduit 100 flow out into the external atmosphere. The outflow of air from the channel 27 will take place via a calibrated hole 12 located next to the gap 11c and will continue even after the automatic resetting until the brake has been reset manually. The calibrated hole 12 has a whistle designed to indicate which emergency brake has been activated. In particular, once the automatic reset has occurred the air leaking out of the hole 12 will be the only leak in the device. This is to ensure that it is easy to identify the device that has been activated.

The quantity of air which will flow out of the hole 12 will be very small and will have absolutely no influence on the charge in the main conduit. It will only be used to identify the intervention point on the train more quickly.

Moreover, in the operative condition of the device, the gap 11d does not perform any function, while in the non-operative condition, i.e. after the handle has been returned to the non-pulled condition, it facilitates the release of the air from the chamber 7 via a hole 7a connected to the channel 26 and to a discharge channel 28 which leads to the external atmosphere. Moreover, when the device is not in use, the gap 1d facilitates the outflow of air due to any small leaks there may be from the chamber 7 via the channel 26 towards the external atmosphere.

According to the present embodiment, on the shank 11b there is a rod 13 the first section of which is connected at one end 13a to the said shank and at the other 13b to a small piston 14 and, the second section of which is connected to the small piston 14 and the small piston 6.

In addition, the shank 11b is fitted with a joint 15 envisaged to bring the handgrip 11a of the handle into the non-operative condition when the resetting means 16 are used.

As mentioned earlier, the device provides for the main piston 10 which comprises a central shank 10a with, at one end, a T-shaped element 10b designed to slide inside the chamber 7 from a resting position, in which the wings of the T are in contact with the internal wall 7b of the chamber 7 and compress a spring 71 and a spring 17c (which will be illustrated later), into a working position, in which the wings of the T are in contact with the opposite wall 7c of the chamber when the springs 71 and 17c are used (the said springs facilitating the movement) and, at the other end of the shank, a substantially cylindrical element 10c which is designed to move inside a chamber 17. In particular, the cylindrical element 10c has a couple of recesses 10d arranged symmetrically around the shank 10a and on the side of this latter, which are envisaged to house a couple of blocks 50 and 51 connected to a rotary plate 18. Moreover, on the side where the recess 10d houses the block 50, the cylindrical element 10c has the groove 20, while on the opposite side there is a groove 20a, which is used for the passage of the air for charging the tank 2 coming from the channel 3d towards the channel 3e. Lastly, the cylindrical element 10c has an arrow-shaped element 10e with a tip designed to close an opening 17a in the chamber 17. In more detail, to maintain the closure of the opening 17a, the arrow-shaped element 10e is assisted by a spring 10f and a bolt 10g which, suitably set, have the task of sealing the surface 17d of the chamber and the surface of the arrow-shaped element which must overcome the pressure from a channel 3f and maintain the seal.

According to the present embodiment, the chamber 17 has a discharge hole 17b for the air coming from the main conduit and present in the chamber 17 when the brake is activated. Moreover, there is the spring 17c, mentioned earlier, in the chamber 17, which helps to push the cylindrical element 10c into the operative condition.

According to this invention, the device 1 comprises a rotary plate 18 which is rotatably engaged at a point 18a to the bearing structure of the device and is pre-set to rotate clockwise under the control of the handle 11.

In particular, the rotary plate 18 is provided with a protrusion 18b which is designed to engage, in the non-operative condition of the device, with the second overhang 11g and rotate until the protrusion 18b moves away from the second overhang 11g when the emergency brake handle is pulled.

Moreover, the rotary plate 18 comprises a couple of levers 30 and 31 located respectively, the first, between the protrusion 18b and the centre of rotation 18a and, the second, symmetrically with the first, in relation to the centre of rotation 18a.

In more detail, the first lever 30 has one end 30a positioned in the centre of the rotary plate 18 and the other end 30b engaged with the block 50. Moreover, the first lever 30 is fitted with a first sprung element 300 designed to keep the block 50 in the recess 10d. Similarly, the second lever 31 has one end 31a positioned in the centre of the rotary plate 18 and the other end 31b engaged with the block 51. The second lever 31 is also fitted with a second sprung element 310 which is designed to keep the block 51 in the corresponding recess 10d.

In addition, the rotary plate 18 comprises a couple of mallets 40 and 41 connected to each of which is a spring 400 and 410. In more detail, the spring 400 is connected to one end 40a of the first mallet 40, the said spring 400 being designed to hold the said mallet fast against a clamp 40b.

Similarly, there is a spring 410 connected to one end 41a of the second mallet 41, the said spring 410 being designed to hold the said mallet fast against a clamp 41b.

The free end of the mallet 41 is set to come into contact with one end of a small lever 43 which is held by a spring 43a. The small lever 43 has a small protrusion 43b.

Similarly, also the free end of the mallet 40 is set to come into contact with one end of a small lever 44 which is held by a spring 44a. In addition to everything described up to now, the small lever 44, at the opposite end, has an enlargement 44b which ends with a small pin 44c. In particular, the small protrusion 43b of the small lever 43 is designed to come into contact with the enlargement 44b holding the said small lever so that the small pin 44c does not enter the gap 11f.

When the handgrip of the handle 11 is pulled, the rotary plate 18 rotates and the second overhang 11g moves free of the protrusion 18b which holds it. When the shank 11b lowers, the small pin 44c enters the gap 11f preventing further movement of the said shank. In addition to everything described up to now, the device 1 comprises monitoring means 60 designed to indicate, when the train is composed, whether the handle 11 has been unduly pulled and therefore the device is in the operative condition.

The monitoring means 60 comprise the chamber 5, shown in FIG. 3, which is connected at one end 5a with the channel 2a and is connected, on one side, with the channel 3a—by means of a first union 68—and with the channels 3b and 3c —by means of a second union 69—and, on the other side, symmetrically around the chamber axis, respectively to a channel 3g and the channel 3f.

Inside the chamber 5 is a piston 61 which is constituted of a central rod 61a at one end of which there is a first enlargement 61b which adheres, to the internal walls of the chamber and at the other end of the rod is a second enlargement 61c which also adheres to the internal walls of the chamber. In more detail, the movement of the first enlargement 61b is set to make the said enlargement come into contact with the surface of the end 5a in the absence of air in the tank 2, leaving the passageways with the first union 68 open and symmetrically with the channel 3g while, when there is a passage of air in the channel 2a coming from the tank 2, the first enlargement 61b will be compressed and brought to the end of its stroke towards the end surface 5b of the chamber, thus overcoming the force exerted by a spring 63 present between the wall 5b and the second enlargement 61c of the piston. The lowering of the piston will occur at a pressure of 3 bar which corresponds with the setting of the spring 63. With the movement of the piston towards the surface 5b, the passageways with the first union 68 and the channel 3g will be closed while the passageways with the second union 69 and the channel 3f will open.

With reference to this invention, the device 1 also comprises a stabilising element 70 provided to maintain the second overhang 11g in position along a vertical axis. The stabilising element 70 is engaged with the shank 11b above the joint 15 and it is rotatably engaged with the structure of the device at a point 70a, the said point 70a having the same horizontal axis as the joint 15 in the resting position.

Connected to the stabilising element 70 are the resetting means 16 which comprise a small plate 16a on which is set a housing 16b for a key. In more detail, the small plate 16a is positioned with one side resting on a clamp 16c and with the other it is constrained with a spring 16d. When an operator must reset the device 1 manually, he simply inserts a special key into the housing 16b and, by rotating the said key clockwise, makes the small plate 16a rotate and overcome the resistance of the spring 16d. Next, the operator, pushing the handle 11, will make the shank 11b rise again and rotate the stabilising element 70 just enough to be able to pass over the protrusion 18b and move back into the non-operative position.

In the embodiment illustrated, the device also comprises a manual resetting element 80 envisaging screw means which can push the main piston 10 and make it move into the non-operative condition shown in FIG. 2. In particular, the manual resetting element 80 must only be activated in the event of an internal failure within the device.

Moreover, connected to the screw means 80, is a first small bar 80a which commands a signal in which the message OK appears if everything is fine, while if the device is not in the condition to work, the message KO appears.

In addition, the device comprises a second small bar 81 which commands a signal in which the message OK or RESET o WAIT appears. The second small bar 81 is connected with one end to the rotary plate 18 between the centre of rotation 18a and the point 31a at which the second lever 31 is engaged. In particular, when everything is normal and the device is in the non-operative condition, the OK message will appear in a window present on the structure of the said device; when the handle 11 is pulled and the rotary plate 18 is rotated, the WAIT message will appear in the window and when the handle 11 is pulled and the rotary plate 18 has returned to the non-rotated and therefore non-operative position, the RESET message will appear, which indicates the manual reset must be performed by an operator.

After this predominantly structural description, there will now follow a description how the invention in question works.

As already mentioned, a main conduit 100 starts from the train's locomotive A and is present in each carriage B. When the train is composed, the different portions of the main conduit are connected together in order to create a single conduit through which the air passes at a pre-set pressure of approximately 5 bar.

The brakes and the emergency brake are powered by the compressed air which arrives from the main conduit. To brake, one must simply lower the pressure in the main conduit and the diminution of pressure makes a braking device 102 intervene, the said device commanding and activating a commonly known type of pneumatic system, which in turn activates the blocks or disks on the wheels, creating notable friction which reduces the speed of the train. To cause the train to brake, air must therefore be removed from the main conduit and this operation is performed by the driver by means of a brake control cock brake 103 in the driver's cabin and until the outflow of air from the conduit stops and the brake is re-powered, it will not be possible to stop the braking action of the train.

When the emergency brake is activated, this latter substitutes the driver's braking action on the main conduit while the automatic resetting of the emergency brake is comparable to the different manoeuvres that are performed in the driver's cabin, charging the main conduit so that the train can start travelling again.

After outlining how a train is stopped with the brakes, there are three situations which concern the emergency brake: the first is the composing of the train and the charging of the air into the main conduit and the tank 2 with the device in question in the non-operative condition and the handle not pulled, the second is the composing of the train and the charging of the air into the main conduit with the device in question in the operative condition, i.e. with the handle unduly pulled and with the device which must be reset and the third is when the handle of the emergency brake is pulled while the train is moving, once the conduit has been charged.

Considering the first situation mentioned, the device in question functions in the following way.

Immediately after the train has been composed and the main air conduit has been connected, the tank 2 is still empty and the air coming from the main conduit 100 passes through the channel 100a and the filter 100b and arrives in the channel 3a where a part of the flow of air deviates into the first union 68 as the piston 61 is in the resting condition and the other part of the flow of air continues into the channel 3b. The flow of air which deviates into the first union 68, passes into the chamber 5, flows out into the channel 3g filling it until it reaches the small piston 14 which closes the entrance for the air into the small chamber 14a.

The flow of air, which continues into the channel 3b, arrives in the second union 69 but stops as it cannot enter the chamber 5 because the piston 61 closes the said passageway and continues into the channel 3c where a part of the flow will go into the channel 27 and then is stopped by the shank 11b of the handle while the other part will go into the channel 3d, pass along the groove 20a on the cylindrical element 10c continuing into the channel 3e and passing through the check valve 4 until it arrives in the tank 2 filling it with the same pressure of 5 bar as the main conduit.

When the tank 2 has reached a pressure of 3 bar, the air from the tank 2, will go on, via the channel 2a, to compress the piston 61, which will move away from the wall 5a of the chamber 5 until it closes off the entrance for the air from the first union 68 and stops the said air leaving the channel 3g.

With the movement of the piston 61, the air will be able to pass from the second union 69, via the chamber 5, into the channel 3f.

At this point, the tank 2 is charged with air, the piston 61 is lowered and the rest of the device 1 is in the non-operative condition but is also ready to function as illustrated in FIG. 2.

The second situation mentioned is that in which the handle of the device has been pulled unduly when the train is stopped and the main conduit is not charged with air. Once the train has been composed, the main conduit of air has been charged and the tank 2 is empty, the air which arrives from the main conduit 100 passes through the channel 100a and the filter 110b and arrives in the channel 3a where a part of the flow of air deviates into the first union 68, via the chamber 5, continues into the channel 3g until it reaches the small chamber 14a, as the small piston 14 is located on the bottom of the small chamber and does not close off the passageway. The air continues into the channel 25 until it reaches the chamber 7 passing through the check valve 25a.

From the chamber 7, the air cannot leave in the direction of the channel 24 because of the presence of the check valve 9 or in the direction of the channel 22 because of the presence of the check valve 8 but only in the direction of the channel 26 which, though, is closed off by the shank 11b of the handle that has been moved. Therefore, the air which enters the chamber 7 pushes the main piston 10 towards the wall 7b of the chamber and when it arrives at the stroke end, i.e. in contact with the wall 7b, its movement will be prevented as the blocks 50 and 51 will enter their respective recesses 10*d* upon the action of the corresponding springs 300 and 310.

During the movement of the main piston 10, the air which arrives from the main conduit via the channel 3*a* will go into the channel 3*b* and to the second union 69 but stops here as the passageway is closed by the piston 61.

A part of the air, which is not initially deviated into the first union 68, continues into the channel 3*b* and 3*c*, flows towards the channel 3*d* but it is stopped as the cylindrical element 10*c* is closing off the passageway for the air, and it continues, instead, towards the channel 27 and the calibrated hole 12 from where it exits producing a whistle to indicate which handle has been used. At this point, when the main piston 10 has returned to the non-operative condition, the air in the channel 3*d* is no longer stopped by the cylindrical element 10*c* and can pass along groove 20*a* and go into channel 3*e* and onwards to the tank 2.

When the blocks 50 and 51 return to the recesses 10*d*, the levers 30 and 31 connected to said blocks make the rotary plate 18 rotate anticlockwise, bring it back to the non-operative condition and the mallet 40 will drag the small lever 44 so that the small pin 44*c* comes out of the gap 11*f* and, at the same time, the small lever 43 under the force of the spring 43*a* will hold, by means of the small protrusion 43*b* which is bound to the enlargement 44*b*, the small pin 44*c* in a position that ensures it will not interfere with the gap 11*f*. In this way the shank 11*b* will be free to move and so can be reset manually by an operator who, with the key, will make the small plate 16*a* rotate, thus overcoming the resistance of the spring 16*d* and permitting the stabilising element 70 to rotate and the shank 11*b* to rise again with the manual help of the operator and move back into the non-operative condition.

The third situation mentioned is that in which the device is activated by pulling the handle of the emergency brake when the train is moving and the conduit has been charged.

After the train has been composed, the main conduit and the tank 2 have been charged as described in the first situation, the device is in the non-operative condition but it is ready to intervene if activated by the handle being pulled. At this point, the train can leave and during its journey, a person activates the emergency brake by pulling the handgrip on the handle. The action on the handgrip makes the shank 11*b* move from the non-operative condition in FIG. 2 to the operative position in FIG. 3. The movement of the shank 11*b* terminates when the first overhang 11*e* comes into contact with a clamp 90. Once the handle has been pulled, the air present in the channel 27 can leak out into the external atmosphere through the gap 11*c* and the calibrated hole 12, which will begin to whistle to signal the handle pulled condition. The movement of the handle shank will make the gap 11*d* move and therefore will prevent the possibility of the air present in the chamber 7 flowing out via the channels 26 and 28 into the external atmosphere. Moreover, the movement of the shank will make the rod 13 move, which will move the small pistons 14 and 6, creating the connection from the channel 3*g* to the small chamber 14*a* and to the channel 25 in the direction of the chamber 7 as well as the connection from the channel 2*c* to the small chamber 6*a* and to the channel 24 also in the direction of the chamber 7, without there being a passage of air as the piston 61 is in the operative condition.

In addition, the movement of the shank 11*b* implies the movement of the second overhang 11*g* in the same direction and this latter makes the protrusion 18*b* rotate and therefore rotates the rotary plate 18.

In this situation, the second overhang 11*g* will remain in contact with the protrusion 18*b* until the rotation of the plate 18 is sufficient to make it move away. During the rotation of the plate, the mallet 41 will make the small lever 43 rotate, overcoming the resistance of the spring 43*a*, and will move the small protrusion 43*b* away from the enlargement 44*b* present on the small lever 44 which will thus be free to move towards the shank 11*b* upon the action of the spring 44*a*. This movement will result in the small pin 44*c* being inserted into the groove 11*f*, thus impeding any possibility of movement of the handle.

The rotation of the rotary plate 18 implies the movement of the levers 30 and 31 (the first downwards and the other in the opposite direction) which, overcoming the resistance of the respective springs 300 and 310, will cause the corresponding blocks 50 and 51 to leave the respective seats (the recesses 10*d*) in which they are housed, leaving the main piston free to move upon the action of the springs 71 and 17*c* and of the air which enters from the channel 3*f* and pushes against the arrow-shaped element 10*e*.

During the movement of the main piston 10, a considerable passage of air will be created from the main conduit 100 via the filter 10*b*, the channels 3*a* and 3*b*, the second union 69 and the channel 3*f* at the opening 17*a* in order to allow the air out into the external atmosphere via the discharge hole 17*b*.

The exit of the air from the discharge hole 17*b* results in a lowering of the pressure in the main conduit and therefore the train braking as illustrated earlier. The movement of the main piston 10 also results in the movement of the groove 20*a* and the closing off of the air passageway in the direction of the tank 2 of the channel 3*e* as the air in the channel 3*d* is stopped by the cylindrical element 10*c*. In addition to what has been described up to now, the movement of the main piston 10 makes the groove 20 move creating a passage of air from the tank 2 via the channel 2*b*, via the calibrated hole 21, in the direction of the channel 22 to arrive in the chamber 7 via the check valve 8.

At this point, the automatic resetting phase of the emergency brake starts. In fact, as described earlier, the air accumulated in the tank 2 via the channel 2*b*, the groove 20 and the channel 22, begins to arrive in the chamber 7.

The injection of air into the chamber 7 will begin to make the main piston 10 move towards the wall 7*b* of the said chamber and this movement will continue until the groove 20 has moved enough to close off the passageway for the air between the channel 2*b* and the channel 22, thus closing the calibrated hole 21. While the calibrated hole 21 is closing, there opens a possibility for the air to arrive at the chamber 7 by passing from the channel 24 connected to the tank 2 via the channel 2*c* and the small chamber 6*a* as the small piston 6 is not obstructing this passageway, so that the movement of the main piston 10 towards the wall 7*b* may be completed.

When the main piston 10 terminates its movement, the arrow-shaped element 10*e* finally closes the opening 17*a* and so too the possibility for the air to enter the chamber 17 and leave via discharge hole 17*b* and, moreover, it permits the blocks 50 and 51 to return to their respective seats, the couple of recesses 10*d*, upon the action of the corresponding springs 300 and 310 and, consequently, the levers 30 and 31 will make the rotary plate 18 rotate anticlockwise, bringing it back into the starting position, i.e. the non-operative condition.

During the rotary plate's return to the starting position, the mallet 40 will move the small lever 44 consequently making the small pin 44*c* retract so that it moves out of the gap 11*f* in the shank 11*b* and, while the small pin 44*c* moves, the small protrusion 43b on the small lever 43, upon the action of the spring 43a, will go on to engage with the enlargement 44b, thus preventing the small pin moving back into the gap.

Once the automatic resetting just described is complete, the air in the main conduit and therefore in the tank 2 is also restored with the passage of the air from the main conduit via the channels 3a, 3b, 3c, 3d, the groove 20a and the channel 3e. With the automatic resetting, there is a controlled passage of air from the tank 2 to the chamber 7 which is cut off at the opportune moment with the closure of the hole 21, whose calibration is extremely important as it determines the time needed to reset the device. In these conditions, the train can move and so move away from a position which could be dangerous if in a tunnel or otherwise.

Now, the only thing left is the manual resetting which must be carried out by railway staff.

At this point, to bring the device back fully into the non-operative condition, a person must insert the special key into the housing 16b of the resetting means 16 and by rotating the key consequently make the small plate 16a rotate clockwise, overcoming the resistance of the spring 16d. In this way, the stabilising element 70 can rotate and the shank 11b can rise making the shank portion 110b rotate so that the second overhang 11g passes over the protrusion 18b and moves back into the non-operative position.

With the rising of the shank, the small pistons 14 and 6 will go on respectively to close the channels 3g and 2c while the air present will be discharged from the chamber 7 via the hole 7a into the external atmosphere, passing through the channel 26, the gap 11d and the channel 28 and, lastly, the channel 27 will be closed by the shank 11b and the possibility of the air leaving and therefore interrupting the acoustic signal is stopped.

In this way, the present invention achieves the aims proposed.

In fact, the device in question allows the automatic resetting of the emergency brake on trains, once the train has stopped or is on the point of stopping so that the said train can be moved just enough to bring it out of a tunnel or a dangerous situation.

Moreover, the device for automatically resetting the emergency brake allows the railway staff to maintain the control over the train above all in critical and dangerous situations.

Advantageously, the device according to this invention can be installed not only on new trains but also on existing trains.

Moreover, the device enables the drastic reduction, in the event of an accident and/or fire in a tunnel, of the consequences for the people and renders the rescue organisation quick and efficient. In fact, the device, by resetting itself automatically enables the train to move just enough to allow the outflow of people into in a non-dangerous environment.

In addition to everything said up to now, the device is capable of obtaining greater flexibility of use and therefore a notable safety level for the passengers, the railway staff and the train.

Advantageously, the device is easy to manufacture, works well and is also structurally simple.

A further advantage lies in the fact that the device according to the invention does not have any electrical parts which could cause problems and time wastage in trains that are composed and separated several times during their journey.

Naturally, this invention can be modified and variants are possible and such modifications and variants will all fall within the framework of the inventive concept which characterises it.

I claim:

1. A device for automatically resetting the emergency brake on a train of the type which is supplied with compressed air from a main conduit (100) through a conduit (100a) that branches off from the main conduit 100, said device comprising:

a handle (11) including a handgrip (11a) and a shank (11b) for activating the emergency brake;

a rotary plate (18) with a substantially triangular configuration and constructed and arranged to rotate clockwise upon the command of the handle and anticlockwise upon the action of a couple of levers (30 and 31);

a main piston (10) comprising a central shank (10a) having, at a first end, a T-shaped element (10b) constructed and arranged to slide inside a first chamber (7) from a resting position, in which the wings of the T are in contact with an internal wall (7b) of the first chamber (7) and compress a first spring (71) and a second spring (17c), into a working position in which the wings of the T are in contact with an opposite wall (7c) of the first chamber (7) upon the action of also the first and second springs (71 and 17c) which facilitate movement of the piston (10) and, at the other end of the shank, a substantially cylindrical element (10c) which is constructed and arranged to move inside a second chamber (17);

a first tank (2) used to store air for the accumulation of the air to be used for resetting the device, after its activation, and connected to the main conduit (100) by means of first, second, third, fourth and fifth branch conduits or channels (3a, 3b, 3c, 3d and 3e);

a first channel (2a), a second channel (2b) and a third channel (2c) which start at the tank (2) and arrive respectively at a third chamber (5), at the main piston (10) and at a small fourth chamber (6a), in which there is a small piston (6);

the device being constructed so that the air in the first chamber (7) coming from the tank (2) expands and causes the movement of the main piston (10);

a fifth channel (25) which connects together a small fifth chamber (14a) and the first chamber (7) for the flow of air to the fifth chamber and a sixth channel (26) which starts from the first chamber (7) and is constructed and arranged to release the air from the fifth chamber into the external atmosphere;

sixth, seventh and eight channels (22, 24 and 27) for supplying air to components of the device;

monitoring means (60) for signaling, at the moment the train is operating normally, if the handle (11) has been pulled and the device is in the operative condition;

a stabilising element (70) engaged with the shank (11b) and rotatably engaged with the device; and resetting means (16) connected to the stabilising element (70).

2. A device according to claim 1 wherein said shank (11b) has a substantially cylindrical configuration and has a couple of gaps (11c and 11d) which are symmetrical in relation to the axis of the said shank, a first overhang (11e) being provided on a side of the shank having the gap (11d), a groove (11f) and a second overhang (11g) located in sequence on on a side of the shank having the gap (11c).

3. A device according to claim 1, wherein the shank (11b) has a rod (13), a first section of which is connected with one end (13a) the shank and another end (13b) of the shank being connected to a second small piston (14) and, a second section of the rod connected to the second small piston (14) also being connected to the first small piston (6).

4. A device according to claim 1, wherein the shank (11b) is fitted with a joint (15) constructed and arranged to bring the handgrip (11a) of the handle into the non-operative condition upon use of the resetting means (16).

5. A device according to claim 1, wherein a cylindrical element (10c) is fitted with a couple of recesses (10d) arranged symmetrically with respect to the shank (10a) and on the side of said shank and constructed and arranged to house a couple of blocks (50 and 51) connected to the rotary plate(18).

6. A device according to claim 5, wherein, on the side of said shank with the recess (10d) which houses the block (50), the cylindrical element (10c) has a groove (20) while, on the opposite side, there is a groove (20a) which is used for the air to pass through, in order to charge the tank (2), the air coming from the fourth branch conduit or channel (3d) and flowing towards the fifth branch conduit or channel (3e).

7. A device according to claim 5, wherein said cylindrical element (10c) has an arrow-shaped element (10e) with a tip which is constructed and arranged to close an opening (17a) in the second chamber (17).

8. A device according to claim 7, wherein said arrow-shaped element (10e), to maintain the closure of the opening (17a), is assisted by a spring (10f) and a bolt (10 g) which make a seal between the surface (17d) of the second chamber and the surface of the arrow-shaped element (10e) overcomes the pressure coming from a sixth branch conduit or channel (3f) and to maintain the seal.

9. A device according to claim 6, wherein said groove (20) has a calibrated hole (21) whose calibration determines the time needed for resetting the device.

10. A device according to claim 9, wherein said sixth channel (22) is connected to the calibrated hole (21) and is fitted with a check valve (8) which enters the first chamber (7).

11. A device according to claim 1, wherein said seventh channel (24) is housed between the small chamber (6a) and the first chamber (7) and is fitted with a check valve (9).

12. A device according to claim 1, wherein said eighth channel (27) is connected to the third channel (3c) and terminates in position with the gap (11c) opening towards the external atmosphere, and adjacent which, there is a calibrated hole (12) fitted with an acoustic signaling device.

13. A device according to claim 1, wherein said second chamber (17) is fitted with an outlet hole (17b) for the air coming from the main conduit (100) and present in the second chamber (17).

14. A device according to claim 5, wherein said spring (17c) which helps to push the cylindrical element (10c) into the operative condition in the second chamber (17).

15. A device according to claim 1, wherein said rotary plate (18) is rotatably engaged with the bearing structure of the device at a point (18a).

16. A device according to claim 1, wherein said rotary plate (18) is fitted with a protrusion (18b) which is constructed and arranged to engage, in the device's non-operative condition, with the second overhang (11g) and to rotate until the protrusion (18b) moves away from the second overhang (11g) when the handle (11) is pulled.

17. A device according to claim 1, wherein said rotary plate (18) includes said couple of levers (30 and 31), which are located respectively, the first, between the protrusion (18b) and the center of rotation (18a) of said rotary plate and, the second, symmetrically with the first, in relation to the center of rotation (18a) of said rotary plate.

18. A device according to claim 17, wherein said first lever (30) has one end (30a) positioned in the center of the rotary plate (18) and the other end (30b) engaged with the block (50).

19. A device according to claim 17, wherein said first lever (30) is fitted with a first spring element (300) constructed and arranged to hold the block (50) in the recess (10d).

20. A device according to claim 17, wherein said second lever (31) has one end (31a) positioned in the center of the rotary plate (18) and the other end (31b) engaged with the block (51).

21. A device according to claim 17, wherein said second lever (31) is fitted with a second spring element (310) constructed and arranged to hold the block (51) in the corresponding recess (10d).

22. A device according to claim 1, wherein said rotary plate (18) comprises a couple of mallets (40 and 41), each one of which has a third and fourth spring (400 and 410) connected to it.

23. A device according to claim 22, wherein said third spring (400) is connected to one end (40a) of the first mallet (40) which is constructed and arranged to hold the mallet fast against a clamp (40b).

24. A device according to claim 22, wherein said fourth spring (410) is connected to one end (41a) of the second mallet (41) which is constructed and arranged to hold the mallet fast against a clamp (41b).

25. A device according to claim 22, wherein a free end of the mallet (41) is set to come into contact with one end of a small lever (43) held by a fifth spring (43a) and fitted with a small protrusion (43b).

26. A device according to claim 22, wherein a free end of the mallet (40) is set to come into contact with one end of a small lever (44) held by a spring (44a).

27. A device according to claim 26, wherein said small lever (44) has an enlargement (44b) which ends in a small pin (44c).

28. A device according to claim 1, wherein said monitoring means (60) comprise the third chamber (5), which is connected at one end to the first channel (2a) and, on one side, is connected with the first branch conduit or channel (3a) by means of a first union (68) and with the second and third branch conduits or channels (3b and 3c) by means of a second union (69) and on the other side, symmetrically in relation to the axis of the third chamber, respectively, to a seventh branch conduit or channel (3g) and to a sixth branch conduit or channel (3f).

29. A device according to claim 1, wherein inside the third chamber (5) there is a piston (61) made of a central rod (61a) one end of which has a first enlargement (61b) which adheres to the internal walls of the chamber and whose movement is set to make said rod come into contact with surface of the end (5a) when there is no air in the tank (2), leaving the passageway to the first union (68) open and symmetrically with a sixth branch conduit or channel (3g), and the other end of which has a second enlargement (61c) which adheres to the internal walls of the third chamber and whose movement is set to close the air passageway to the second union (69) and the sixth branch conduit or channel (3f) when the device is in the non-operative condition.

30. A device according to claim 1, wherein a spring (63) is housed between the free end of the second enlargement (61c) and the end (5b) of the third chamber (5).

31. A device according to claim 1, wherein said stabilizing element (70) is constructed and arranged to hold the second overhang (11g) in position along a vertical axis.

32. A device according to claim 1, wherein resetting means are connected to the stabilizing element (70) and comprises a small plate (16a) onto which a housing is set for a key, said small plate (16a) being located with one side resting on a clamp (16c) and the other side being constrained by a spring (16d).

33. A device according to claim 1, wherein said device has a manual resetting element (80) which comprises a screw capable of pushing the main piston (10) and making the main piston move into the non-operative condition.

34. A device according to claim 33, wherein a first small bar (80a) is connected to the screw means (80), said first small bar (80a) controlling a signal in which the message OK appears if everything is fine while, if the device is not in the condition to work, the message KO appears.

35. A device according to claim 1, wherein said device comprises a second small bar (81) which controls a signal in which the message OK or RESET or WAIT appears, said second small bar (81) being connected at one end to the rotary plate (18) between the centre of rotation (18a) of said rotary plate and the point (31a) at which said second small bar is engaged with the second lever (31).

36. A device according to claim 1, wherein said fifth branch conduit or channel (3e) is fitted with a check valve (4) located in proximity with the tank entrance (2).

* * * * *